United States Patent [19]

Rupprecht

[11] Patent Number: 5,111,915
[45] Date of Patent: May 12, 1992

[54] SLIDING SADDLE DISK BRAKE

[75] Inventor: Bernd Rupprecht, Edingen-Neckarhausen, Fed. Rep. of Germany

[73] Assignee: Deutsche Perrot-Bremse GmbH, Mannheim, Fed. Rep. of Germany

[21] Appl. No.: 596,077

[22] Filed: Oct. 11, 1990

[30] Foreign Application Priority Data

Oct. 11, 1989 [DE] Fed. Rep. of Germany ........ 3934019

[51] Int. Cl.⁵ ...................... F16D 65/02; F16D 65/16
[52] U.S. Cl. .................................. 188/73.45; 188/71.1
[58] Field of Search ................ 188/71.1, 73.31, 73.43, 188/73.45, 170, 370

[56] References Cited

U.S. PATENT DOCUMENTS

| | | | |
|---|---|---|---|
| 3,628,639 | 12/1971 | Daley, Jr. | 188/73.45 |
| 3,862,674 | 1/1975 | Vananrooy et al. | 188/73.45 |
| 3,887,045 | 6/1975 | DeHoff et al. | 188/71.1 X |
| 3,990,543 | 11/1976 | Grewette et al. | 188/71.1 |
| 4,530,423 | 7/1985 | Ritsema | 188/73.45 X |

FOREIGN PATENT DOCUMENTS 733796 10/1973 Fed. Rep. of Germany.
2804977 8/1979 Fed. Rep. of Germany.
2845275 4/1980 Fed. Rep. of Germany.

OTHER PUBLICATIONS

WABCO, Bremstechnisches Taschembuch, Seite 494 Aug. 1987.

Primary Examiner—Robert J. Oberleitner
Assistant Examiner—Peter M. Poon
Attorney, Agent, or Firm—Fleit, Jacobson, Cohn, Price, Holman & Stern

[57] ABSTRACT

A sliding saddle disk brake used as a parking or emergency brake has two opposed and spaced legs (4,6) on opposite sides of a brake disk (10), a cross member (8) connecting the legs and an activator (12) arranged in one brake saddle leg (4). First and second brake shoes (22) having linings (24) thereon are positioned between brake saddle legs (4,6). The brake saddle has projections (14,16) on opposite sides in which are supported respective bolts (18) extending parallel to the axis of the brake disk. The brake shoes have forked ends (26) supported for axial movement along the bolts. Two independent bracket members (28, 28') mounted on the vehicle have guide bores (34, 34') which receive corresponding bolts (18) with radial clearance to allow axial and radial movement of the saddle relative to the mounting bracket member (28, 28').

6 Claims, 3 Drawing Sheets

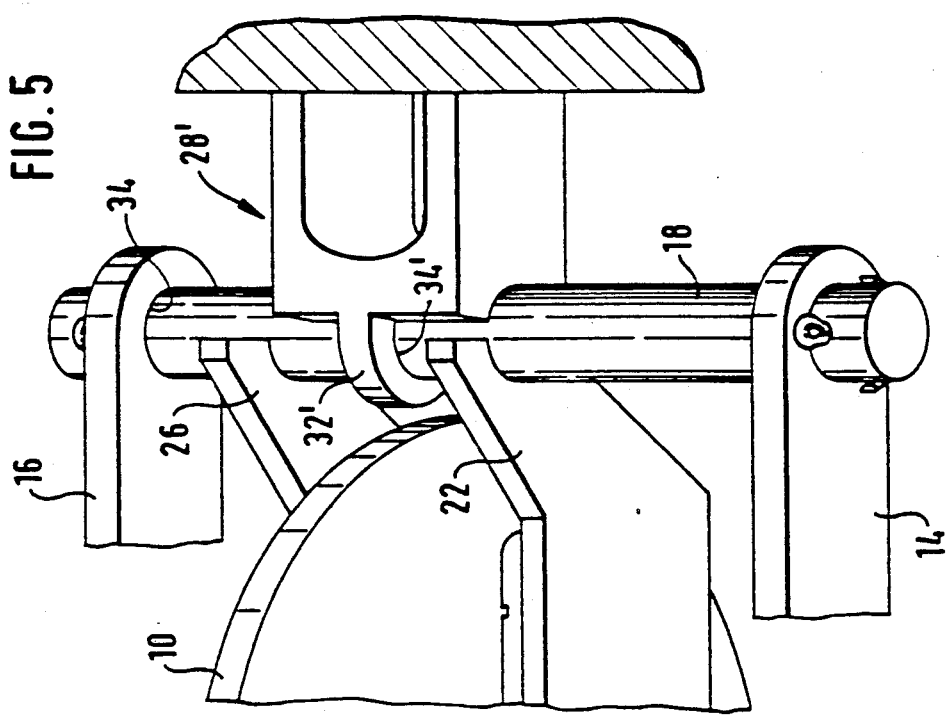
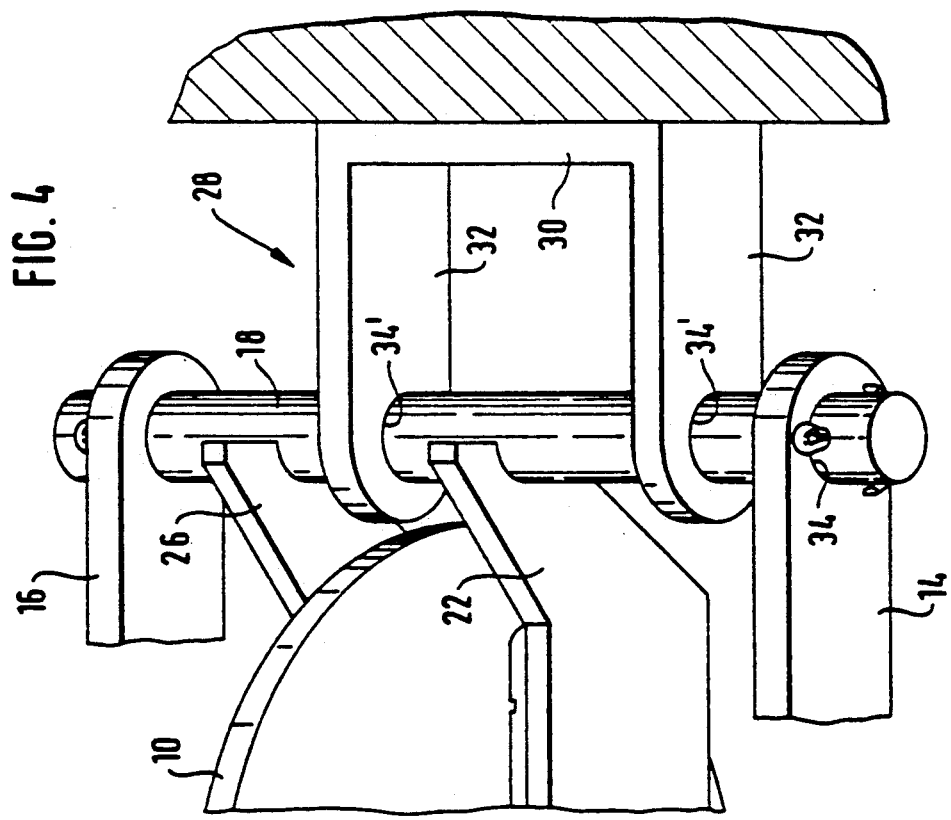

SLIDING SADDLE DISK BRAKE

BACKGROUND OF THE INVENTION

This invention relates to a sliding saddle disk brake, which can be used as a parking or emergency brake, and which is mounted on a vehicle by a bracket arrangement.

In a brake of this type, the brake saddle may be mounted on the brake bracket arrangement via bolt guides which can move parallel to the axis of the disk brake. The saddle typically includes a cross member connecting respective saddle legs which hold the brake disk between them. An actuator device, preferably a spring-loaded system is supported in one brake saddle leg, and respective brake shoes are associated with the actuator and with the brake saddle leg opposite the actuator. The two brake saddle legs have projections on opposite sides of the brake saddle cross member, and the brake bracket arrangement has cross members parallel to the plane of the brake disk. The projections are disposed opposite one another in pairs and the cross members are arranged between them. The projections and cross members are connected by respective bolts on opposite sides of the disk axis, the bolts extending through aligned bores in the projections and cross members. The brake shoes may be supported at their opposite ends against the respective bolts.

A sliding saddle disk brake is disclosed in German Patent Document DE 28 45 275 A1 which is of this type and in which the brake bracket arrangement is a single-piece bracket member. The two bolts are arranged without radial play or clearance in the respective bores of the cross members of the bracket member and fixed axially with a safety rod. The bores in the projections of the sliding saddle legs are, on the other hand, formed as guide bores which hold the corresponding bolts so as to be capable of movement with radial clearance. In this brake, during manufacture of the receiving and guiding bores, very close manufacturing tolerances are required for the brake function, and the bracket member can only be delivered to the customer completely assembled with the brake saddle. Separate manufacture and installation of these parts by different manufacturers is impossible.

SUMMARY OF THE INVENTION

The invention has as- an object, the provision of a sliding saddle disk brake of the above type which is suitable in structure and function for use as a parking brake, is of simple design, assures substantially uniform contact of the brake linings-and makes possible the separate manufacture and assembly of the two brake parts, namely the brake saddle on the one hand, and brake bracket on the other.

According to the invention, the brake bracket arrangement includes two bracket members for mounting independently of one another on the vehicle, each of which has at least one cross member with a guide bore. The respective bolts are removably installed in the bores of the projections on the brake saddle legs substantially without radial play and are guided in the guide boring of the cross member of the corresponding bracket part with radial play.

The radial play of the two bolts in the guide bores of the cross members of the corresponding bracket members compensates for the manufacturing tolerances resulting from being manufactured and installed by different parties. In addition, the brake saddle can be seated in various ways on different brake bracket constructions. As a result of the bearing play, both the brake saddle and the brake linings can be guided safely over their supports, and the brake linings will contact the brake disk in an optimal manner.

When used as a parking brake which will be in a certain braking position over a long time period, a large bearing tolerance of the bolts in the corresponding guide bore may also have the advantage that rust cannot attack it so easily and interfere with smooth operation.

BRIEF DESCRIPTION OF THE DRAWINGS

Other details, advantages and features of the invention will be understood from the following description with reference to the accompanying drawings wherein:

FIG. 4 is a perspective fragmentary detailed view of one of a pair of bolt guides for the brake saddle and a corresponding bracket member; and FIG. 5 is a view similar to FIG. 4 of a modified bracket arrangement.

DESCRIPTION OF PREFERRED EMBODIMENTS

Figure 1:
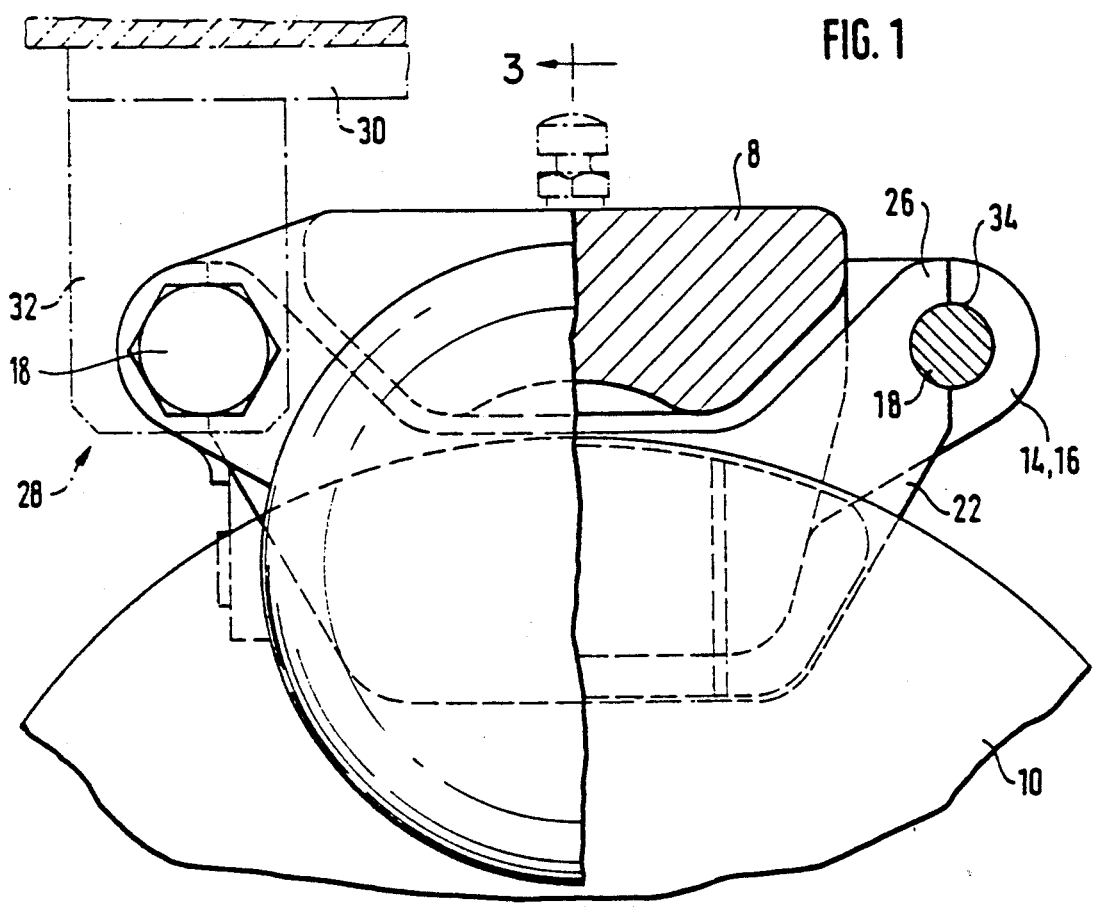
FIG. 1 is a partially cut-away side elevational view of a sliding saddle disk brake.
Figure 2:
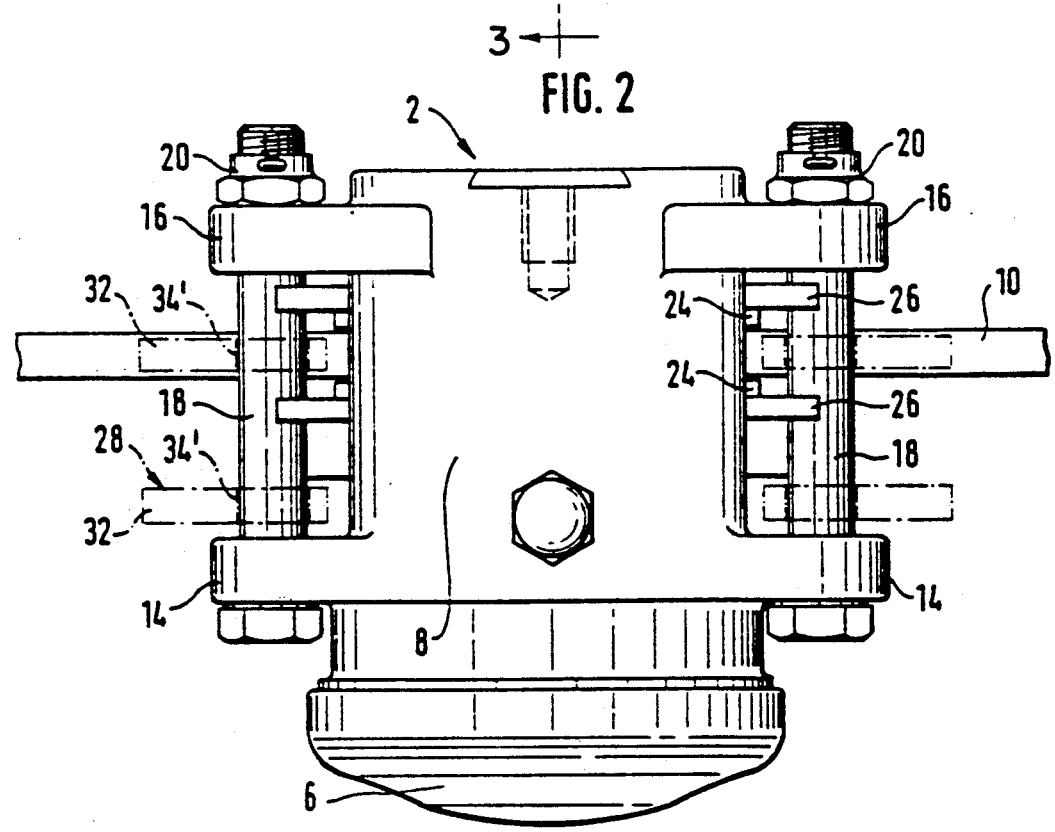
FIG. 2 is a top plan view of the brake saddle of FIG. 1.
Figure 3:
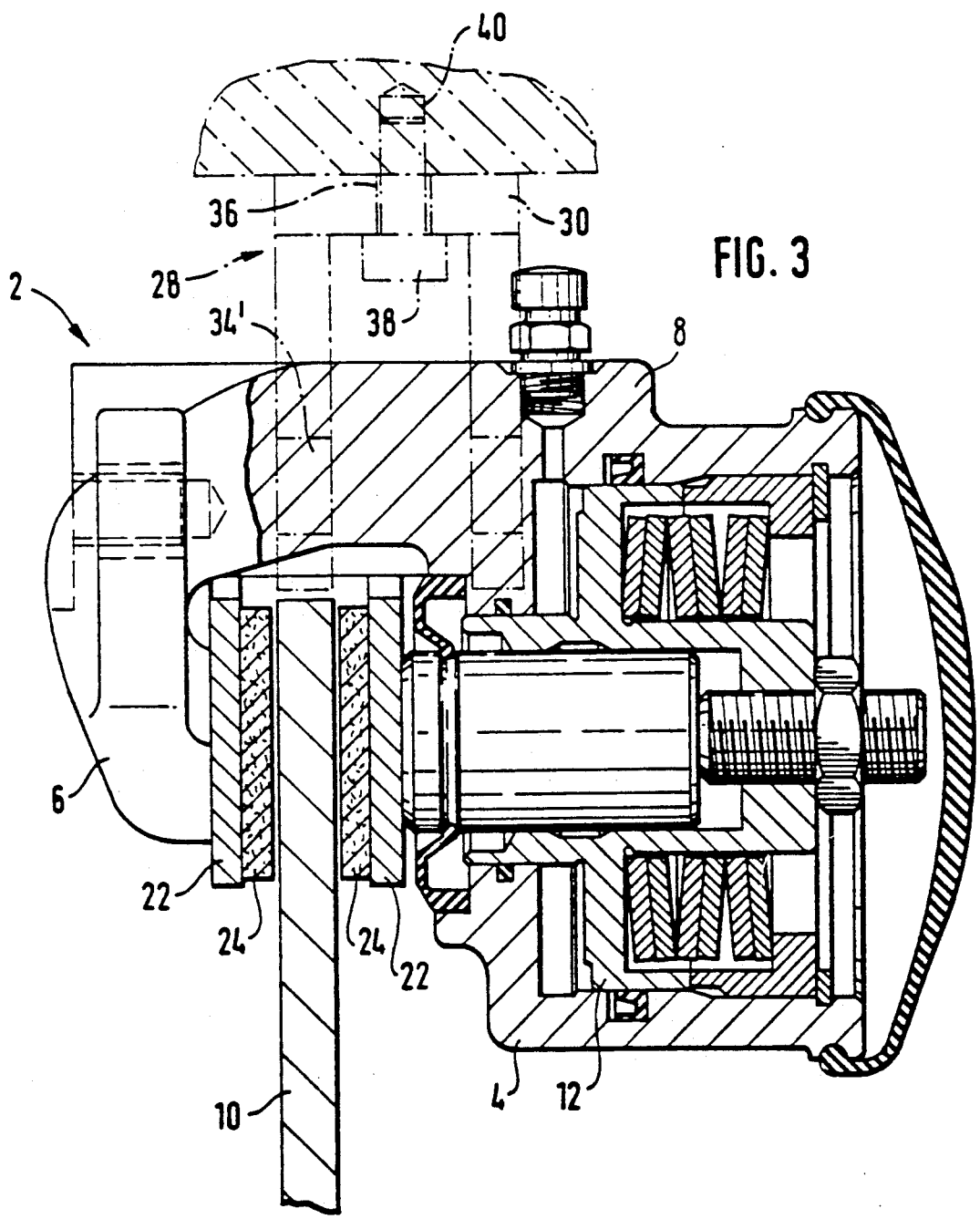
FIG. 3 is an axial section through the brake saddle taken along line 3—3 of FIG. 1.

A brake saddle 2 shown in FIGS. 1 through 3, consists conventionally of two brake saddle legs 4 and 6 which are connected with one another by a cross member 8. A brake disk 10 is received between the legs. In one brake saddle leg 4 a spring-loaded actuator is arranged. Since such spring-loaded actuators are well known, a detailed description is omitted. It is sufficient to point out that such an actuator has a piston-like actuator part 12 movably mounted in the brake saddle leg 4, which exerts a load by spring force in the brake actuation direction, and which can be hydraulically or pneumatically activated to initiate braking in the opposite direction.

The two brake saddle legs 4 and 6 are each provided with two projections 14 and 16 respectively lying opposite one another and extending from the cross member 8. Aligned bores 34 are formed in the respective projections on both sides of the saddle. A bolt 18 is inserted in each set of aligned bores 34 and is secured with a nut 20. The arrangement is such that the two bolts 18 are parallel to the axis of rotation of the brake disk 10 and have substantially no play in said bores.

On opposite sides of the brake disk 10 are respective brake shoes 22, each of which is provided with a brake lining 24. As shown in FIGS. 1, 4 and 5 in particular, the opposite ends 26 of the brake shoes are fork shaped, and the brake shoes are supported substantially in known manner with said forked ends 26 engaging against the bolts 18. The shoes can move axially relative to the bolts.

The brake saddle 2 is connected to a motor vehicle by two substantially identical strap-shaped bracket members 28. The bracket members 28 each have a base plate 30 and two cross members 32 extending from the base plate at right angles thereto. The cross members 32 are each provided with a guide bore 34' which receives the corresponding bolt 18 with clearance. The base plates 30 of the bracket members 28 are each provided with a bore 36 through which a fixation screw 38 extends to be threaded into a corresponding threaded bore 40 in a flat area of a part of a motor vehicle, e.g. a transmission housing or cover.

In the modified bracket shown in FIG. 5, each of the two bracket members 28' affixed to the motor vehicle has only one cross bar 32' provided with a guide bore 34' which, as in the version of the bracket member 28 in FIGS. 1 though 4, is arranged in parallel with the plane of the brake disk 10.

It is envisioned that the complete brake including the bolts 18 will be supplied by the brake manufacturer, while the design of the bracket members 28, 28' and the vehicle side components serving to mount them is left to the option of the vehicle manufacturer.

The above-described brakes operate as follows:

When the piston-like activation part 12 is moved in the brake activation direction under the influence of the spring loaded system, the corresponding brake shoe 22 with brake lining 24 engages against the brake disk 10 and the entire brake saddle 2 is pushed in the opposite direction by the reaction force, i.e. to the right in FIG. 3 so that the opposite brake shoe 22 with its brake lining 24 also engages against the brake disk 10. During this movement, the two bolts 18 rigidly connected to the brake saddle 2 are guided in the corresponding guide bores 34' of the two bracket members 28, 28', and the brake shoes 22, are guided along the bolts 18 by their forked ends 26. The braking torque, i.e. the frictional force exerted by the brake disk 10 on the brake linings 24 is transmitted from the forked ends 26 disposed to the front (in the direction of rotation of the corresponding brake shoe 22) to the corresponding bolts 18 and from the latter via the corresponding bracket member 28, 28' to the motor vehicle. Therefore there is little danger of uneven wear of the brake linings 24 as a result of an elastic deformation of the brake saddle 2.

To replace the brake linings, the nuts 20 are unscrewed from the bolts 18, after which the bolts 18 are pulled out of the projections 14 and 16 of the two brakes saddle legs 4 and 6 and out of the cross members 32, 32' of the bracket members 28, 28' so that the entire brake saddle 2 in the plane of the brake disk 10 can be moved and disassembled. It is sufficient, however, to pull only one bolt, since the brake shoes no longer have any hold in this region and can be taken away from the remaining bolts out of the region of the brake saddle.

I claim:

1. In a sliding saddle disc brake and mounting bracket assembly including a brake saddle with opposed legs, a brake actuator mounted in one of said legs, first and second brake shoes between and associated with said legs, pairs of projections extending from opposite sides of said saddle, aligned bores in each pair of projections, a respective mounting bolt extending through said aligned bores in each pair of projections and extending substantially parallel with the rotational axis of a brake disc to be received between said brake shoes, the improvement comprising:

two mounting bracket members for securing to a vehicle on opposite sides of said saddle;

at least one cross-bar on each bracket member having a guide bore therein;

said bolts securing said saddle between said bracket members by insertion of said respective bolts through said respective aligned bores in said projections and through respective guide bores in said at least one cross bar of each bracket member;

dimensions for said mounting bolts and aligned bores in said projections for fitting said bolts in said aligned bores substantially without radial clearance so that said bolts are substantially rigidly connected to said saddle; and dimensions for said mounting bolts and said guide bores in said cross-bars to provide radial clearance for allowing radial and axial movement therebetween so that said bolts are movably guided in said guide bores.

2. An assembly as claimed in claim 1 wherein:

each bracket member comprises a base having a mounting opening therein for receiving a fastener means to attach said bracket member to a vehicle; and said at least one cross-bar extends from said base.

3. An assembly as claimed n claim 1 wherein:

said brake shoes have respective ends with configurations for facilitating movement along said bolts.

4. An assembly as claimed in claim 3 wherein:

said configurations on a respective end of said brake shoes comprise forked ends for engaging part of each respective bolt.

5. An assembly as claimed in claim 3 wherein:

said at least one cross-bar on each bracket member comprises a pair of cross-bars spaced apart for fitting one of said cross-bars of each pair of cross-bars between said configurations of said ends of respective brake shoes and fitting the other of said cross-bars of each pair of cross-bars between one of said configurations on one of said respective ends of said brake shoes and one of said projections.

6. An assembly as claimed in claim 1 wherein:

said projections are aligned with respective legs.

* * * * *